US012775322B2

(12) United States Patent
Sethi et al.

(10) Patent No.: US 12,775,322 B2
(45) Date of Patent: Oct. 27, 2026

(54) CONTEXT-AWARE METHOD FOR ENERGY CONSERVATION FOR EDGE NETWORKS

(71) Applicant: Dell Products L.P., Round Rock, TX (US)

(72) Inventors: Parminder Singh Sethi, Ludhiana (IN); Shree Ramakrishna Rathinasamy, Round Rock, TX (US); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 490 days.

(21) Appl. No.: 18/436,222

(22) Filed: Feb. 8, 2024

(65) Prior Publication Data

US 2025/0258532 A1 Aug. 14, 2025

(51) Int. Cl.
*G06F 1/3209* (2019.01)

(52) U.S. Cl.
CPC .................................. *G06F 1/3209* (2013.01)

(58) Field of Classification Search
CPC ..................................................... G06F 1/3209
See application file for complete search history.

(56) References Cited

U.S. PATENT DOCUMENTS

2020/0304589 A1* 9/2020 Isberg ..................... H04L 67/12

* cited by examiner

*Primary Examiner* — Suraj M Joshi
(74) *Attorney, Agent, or Firm* — Chamberlain, Hrdlicka, White, Williams & Aughtry; Aly Z. Dossa

(57) ABSTRACT

A device network manager, that monitors edge and Internet of Things (IoT) devices on a device network, receives a data processing request, wherein the data processing request specifies an edge device to process data. In response to receiving the data processing request, the device network manager performs a method that includes making a determination that the edge device is in sleep mode, based on the determination, obtaining an energy conservation policy from device network storage, determining a backup strategy for the data processing request using the energy conservation policy, and applying the backup strategy to service the data processing request.

20 Claims, 8 Drawing Sheets

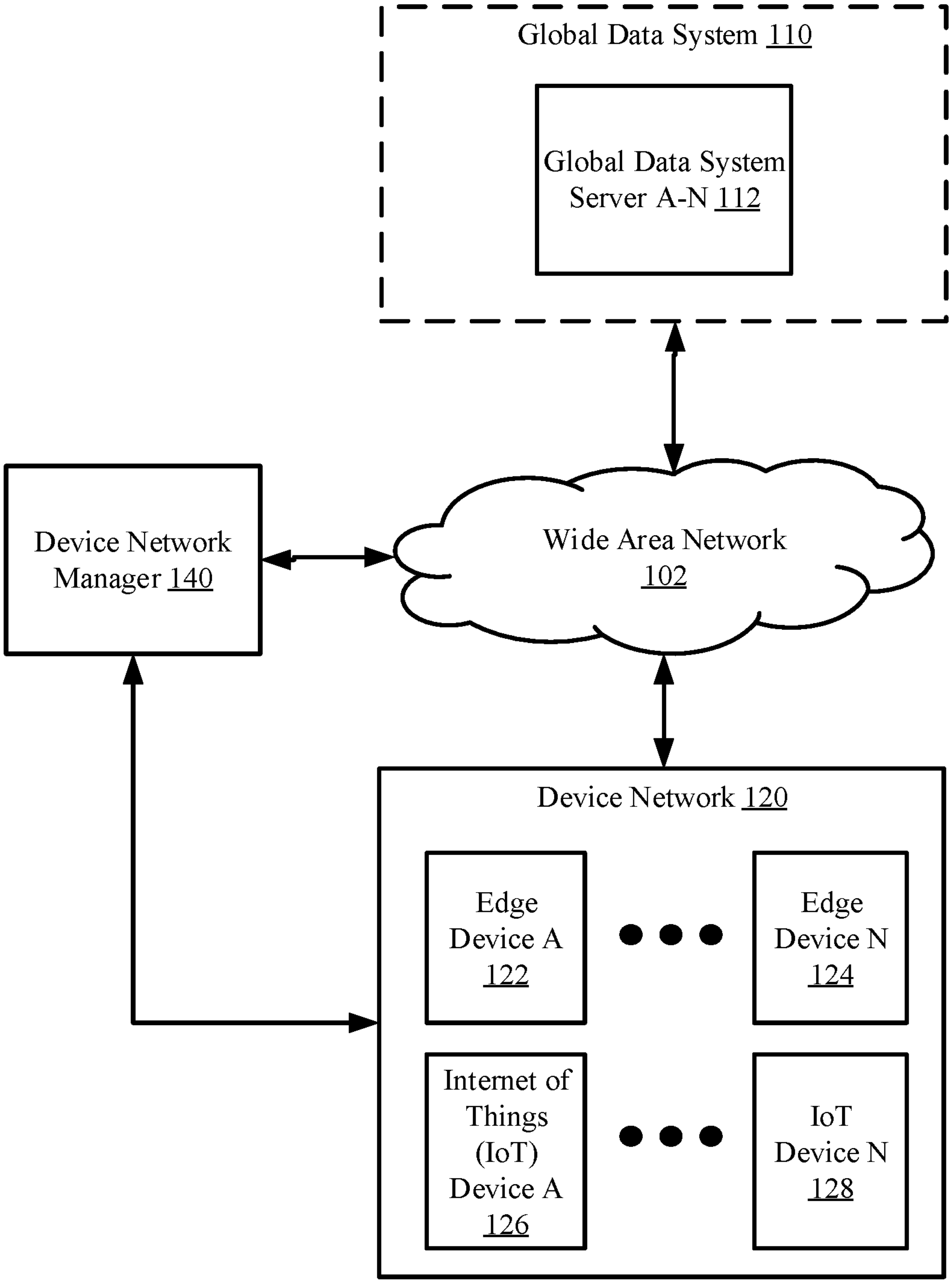
FIG. 1.1

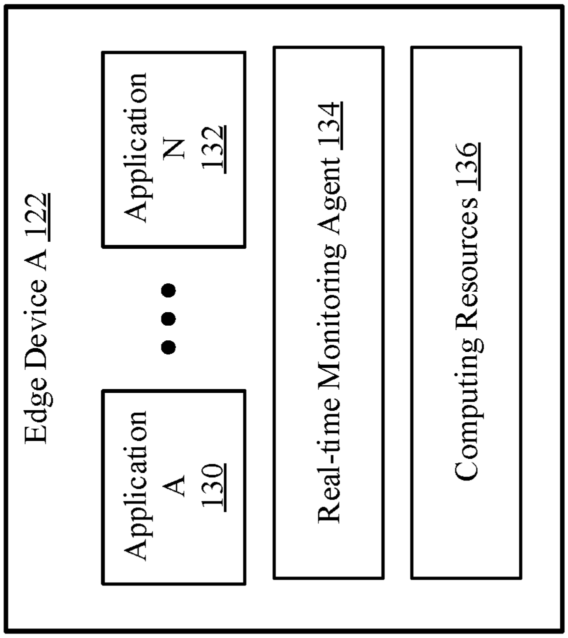
FIG. 1.2

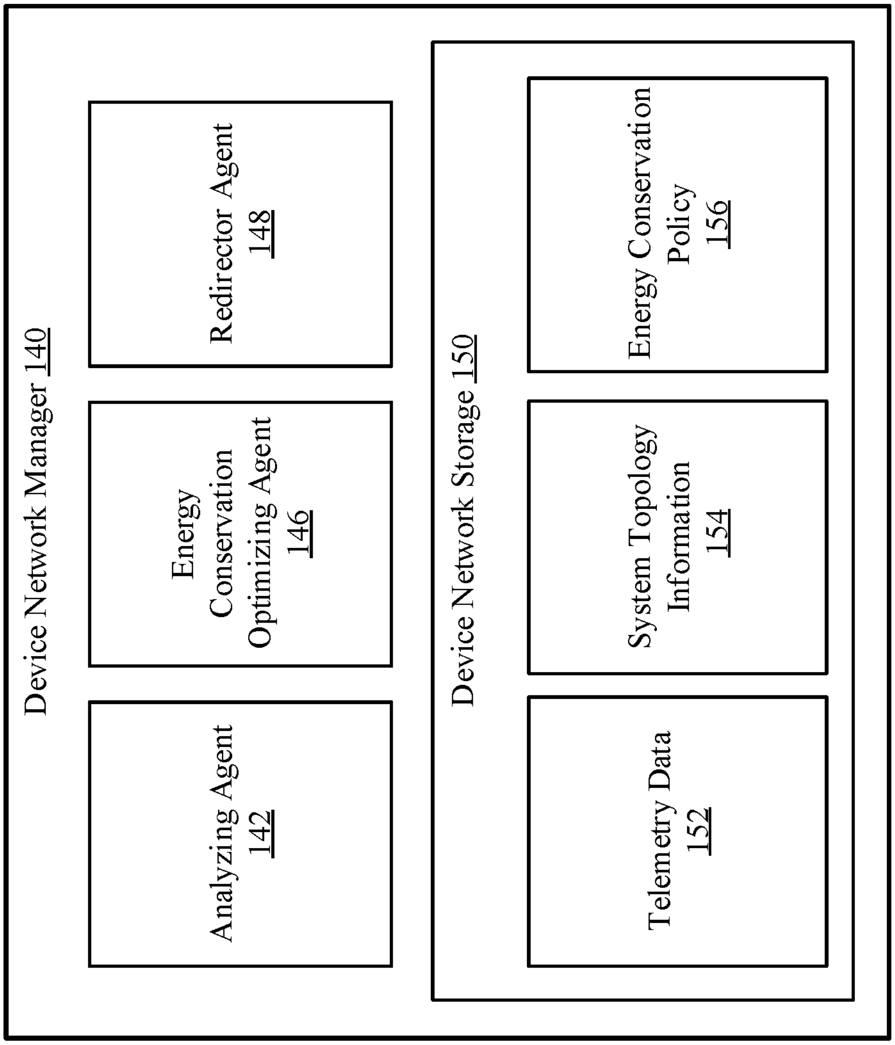
FIG. 1.3

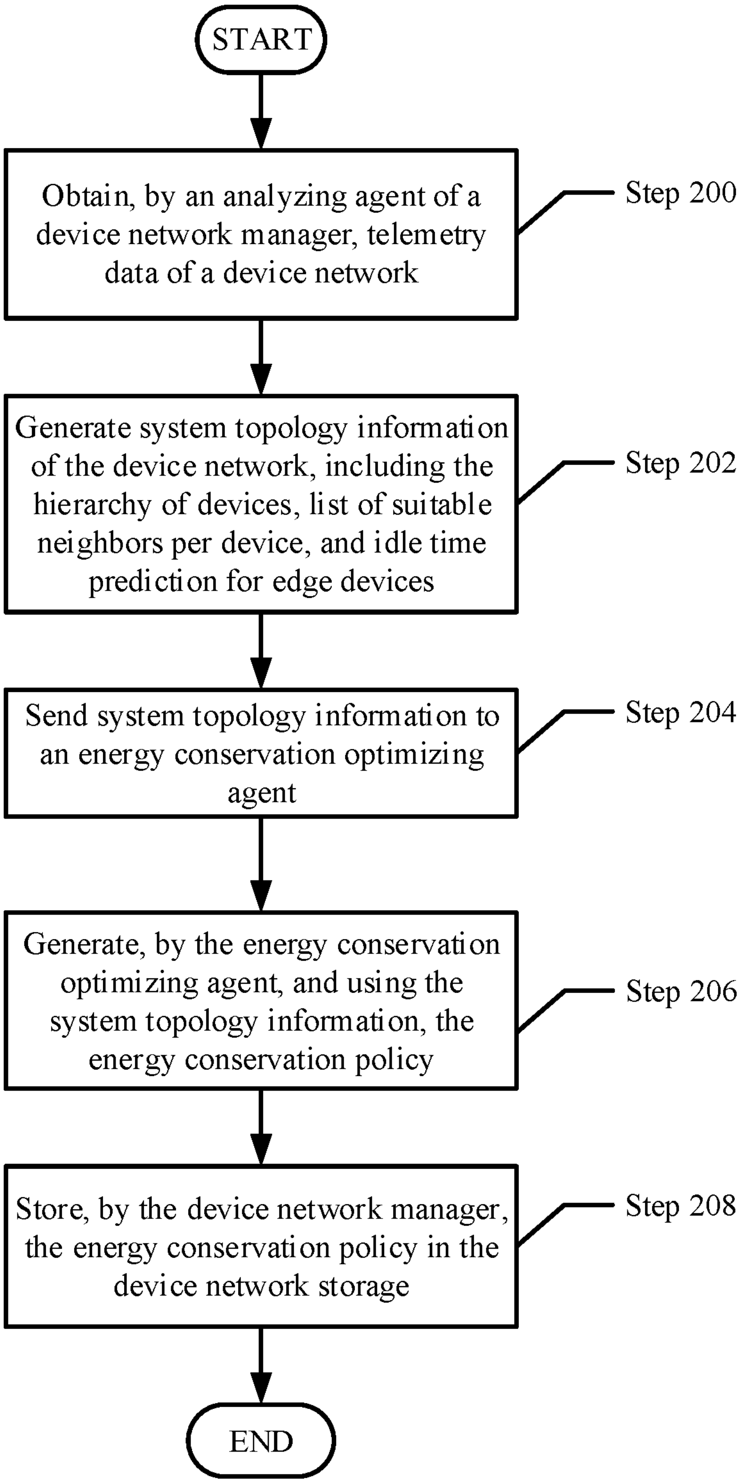
FIG. 2.1

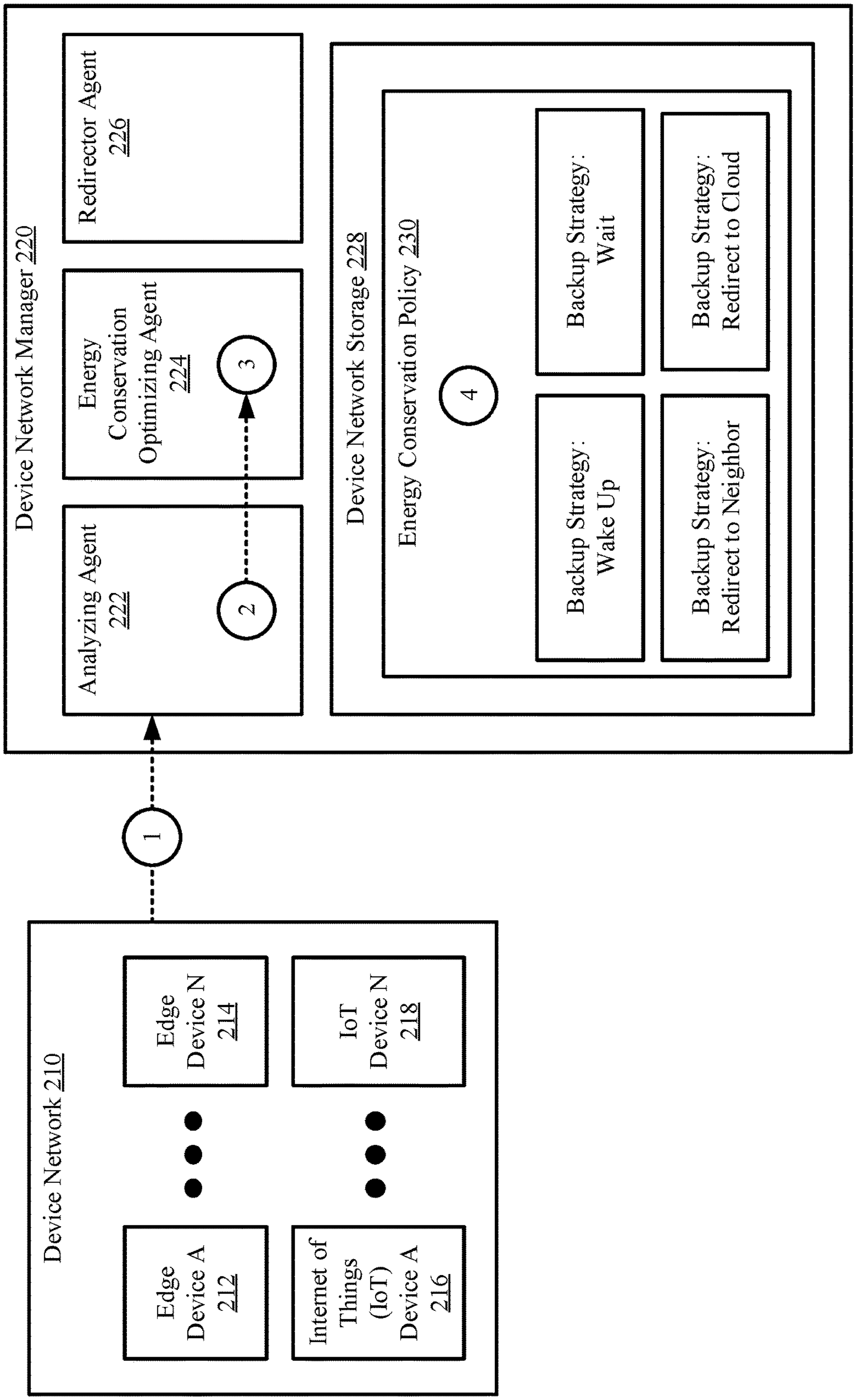
FIG. 2.2

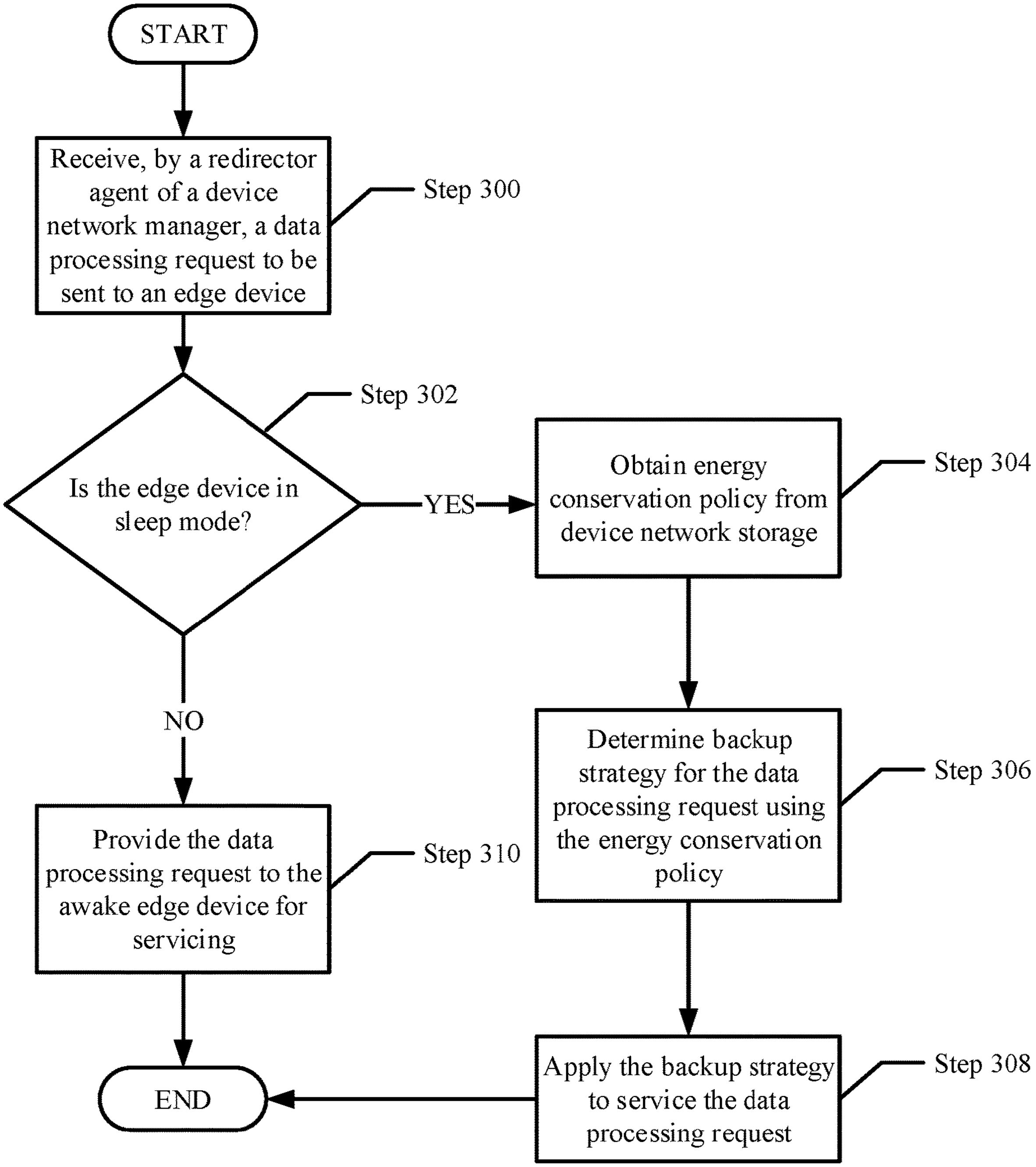
FIG. 3.1

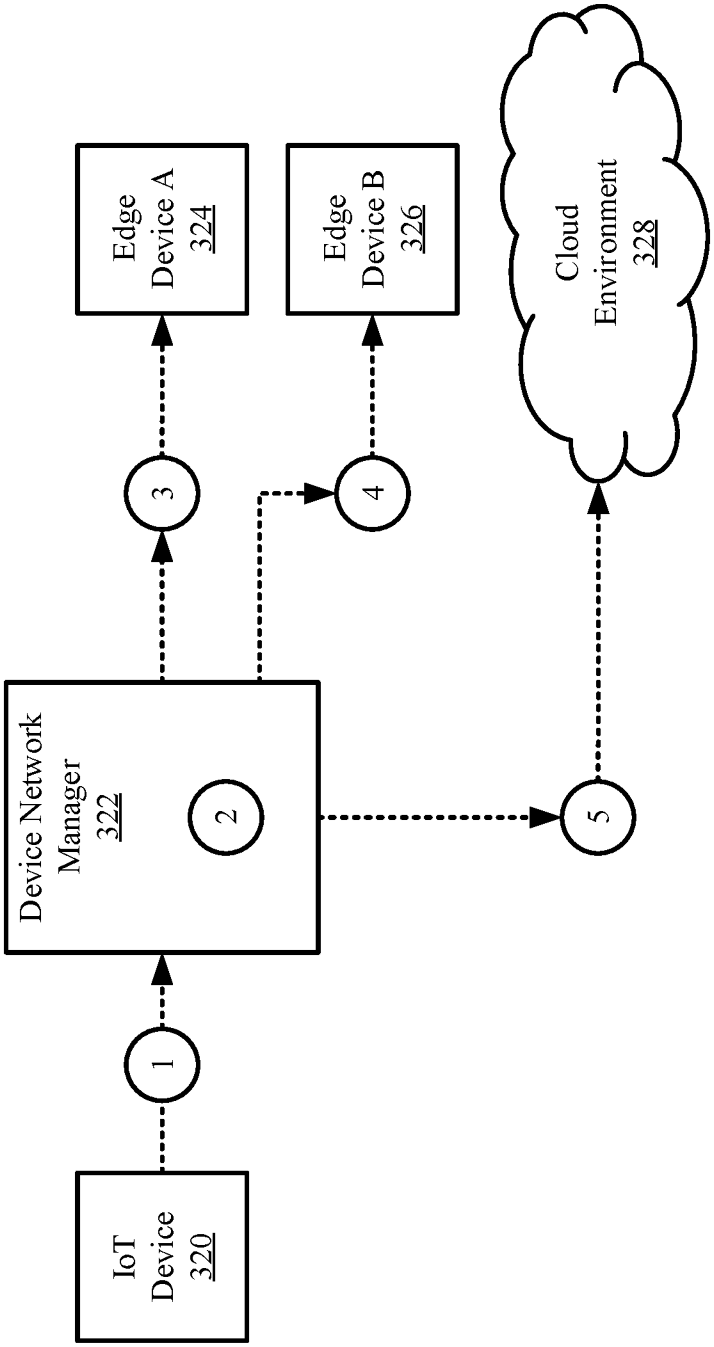
FIG. 3.2

CONTEXT-AWARE METHOD FOR ENERGY CONSERVATION FOR EDGE NETWORKS

BACKGROUND

In a computing environment, the devices in a network both transmit and process data. Data processing requests may be sent to devices that are asleep or otherwise unavailable, meaning the request may not be processed efficiently. Further, as the devices remain awake to perform their functionalities, these devices consume power. The devices may be set in sleep mode to conserve power. During sleep mode, the functionality of these devices may be limited.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system including a device network and a device network manager in accordance with one or more embodiments of the invention.

FIG. 1.2 shows a diagram of an edge device on the device network in accordance with one or more embodiments of the invention.

FIG. 1.3 shows a diagram of a device network manager in accordance with one or more embodiments of the invention.

FIG. 2.1 shows a flowchart of a method for generating an energy conservation policy in accordance with one or more embodiments of the invention.

FIG. 2.2 shows a diagram of an example for generating an energy conservation policy in accordance with one or more embodiments of the invention.

FIG. 3.1 shows a flowchart of a method for conserving energy in accordance with one or more embodiments of the invention.

FIG. 3.2 shows a diagram of an example for conserving energy and redirecting data processing requests in accordance with one or more embodiments of the invention.

DETAILED DESCRIPTION

Figure 4:
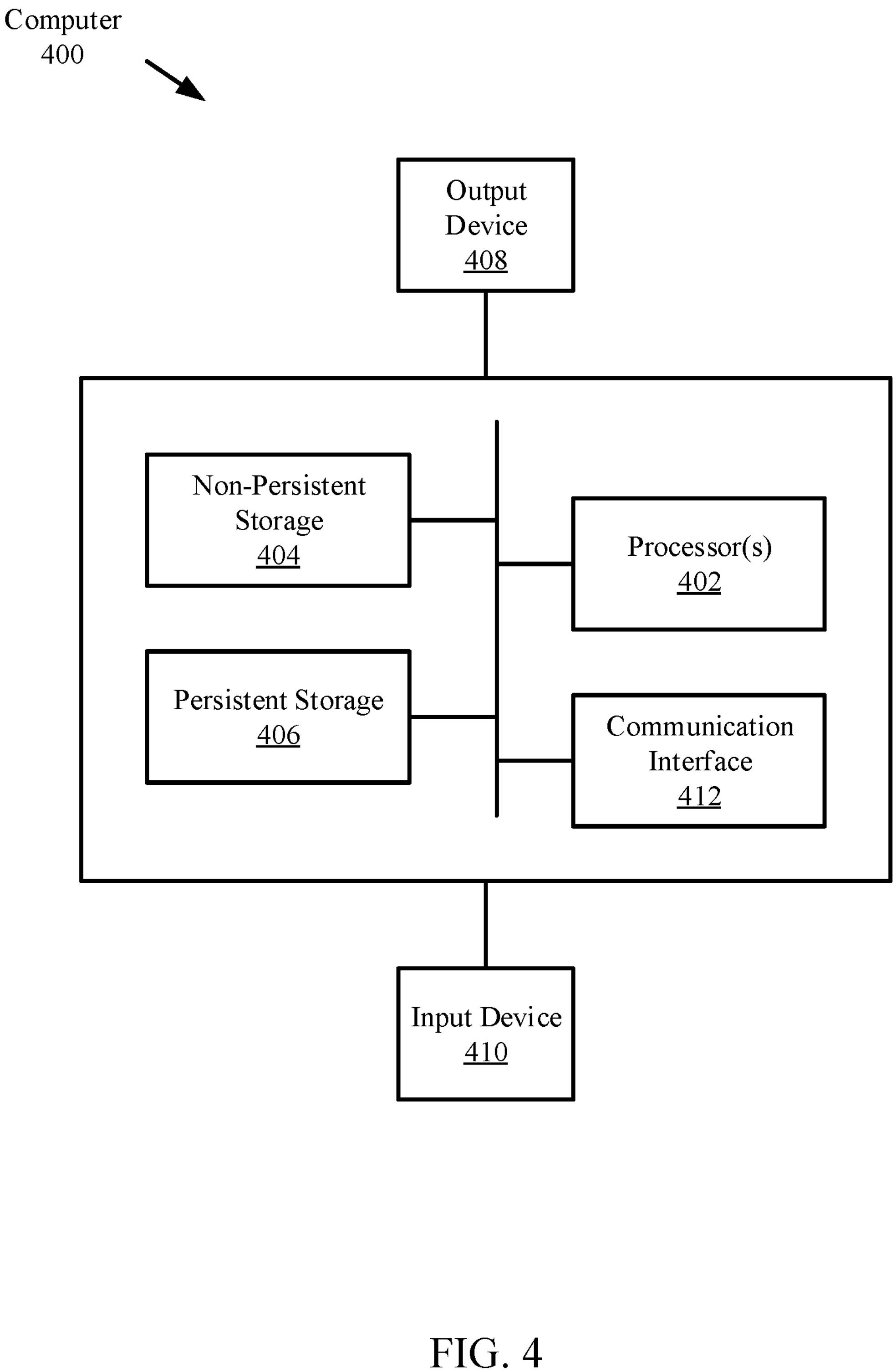
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for conserving system resources while conducting data processing requests. Embodiments disclosed herein utilize context-aware software, real-time monitoring of traffic and system topology, and machine learning algorithms to generate a policy that assists the system in conserving energy and computing resources. A device network manager in accordance with one or more embodiments disclosed herein includes functionality to fully understand and improve the power consumption of the edge devices on a device network when servicing data processing requests. One or more embodiments of the invention improves upon the previous method of processing data requests on edge environments, as there are currently no energy conservation policies available to implement on device networks with edge devices.

FIG. 1.1 shows a diagram of a system in accordance with one or more embodiments of the invention. The system may include a wide area network (102), a global data system (110), a device network (120), and a device network manager (140). The system may include additional, fewer, and/or other components without departing from the invention. Each of the components in the system may be operatively connected via any combination of wireless and/or wired networks, e.g., the WAN (102).

In one or more embodiments, the WAN (102) is the wide area network that performs the functionality of allowing communication between components of the system described throughout this application. The WAN (102) may include any number of devices within any components of the system, as well as devices external to or between such components of the system. The WAN (102) provides the operative connectivity between the global data system (110), each of the devices (122, 124, 126, 128) in the device network (120), and the device network manager (140). Each of the aforementioned system components connected by the WAN (102) will be described in detail below.

In one or more embodiments, the global data system (110) may include a plurality of global data system servers (112) without departing from the invention. The global data system servers (112) may provide computer-implemented services to users. The global data system (110) may operate in a cloud environment, accessible by the device network (120), the device network manager (140), and/or any other entity via the wide area network (102). In one or more embodiments, the computer-implemented services provided by the global data system servers (112) include data storage, data processing, data collection (e.g., using the device network (120)), and application execution. Other computer-implemented services may be offered by the global data system (110) without departing from the invention.

In one or more embodiments, the device network (120) may be a data architecture which may include a plurality of edge devices (122, 124) and Internet of Things (IoT) devices (126, 128). A device network (120) may be implemented on a system with the intention of distributing the processing workload such as the data processing requests from the device network manager (140). A plurality of edge devices (122, 124) and IoT devices (126, 128) may exist on the device network (120). Examples of an edge device may include, but are not limited to, a smartphone, a laptop, a tablet, a sensor, a router, a WAN access device, etc. An edge device is not limited to the aforementioned examples and may be another type of device without departing from the scope of the invention. Additional details for the functionality of individual edge devices (132, 134) may be found, for example, in FIG. 1.2.

Examples of an IoT device may include, but are not limited to, pieces of hardware such as wearable “smart” watches or fitness trackers, “smart” speakers with AI assistant technology embedded, “smart” appliances like robotic vacuum cleaners, sensors, video cameras, and a other appliances with internet-connected capabilities. An IoT device (126, 128) may be embedded with technology that allows it to connect wirelessly to a network in order to transmit data. However, in one or more embodiments, the IoT devices (126, 128) may not necessarily include the functionality to service data processing requests on their own. In such embodiments, the IoT devices (126, 128) may communicate with the edge devices (122, 124) to service data processing requests for data generated by the IoT devices (126, 128). An IoT device (126, 128) is not limited to the aforementioned examples and may be another type of device without departing from the scope of the invention.

In one or more embodiments, each edge device (122, 124) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the edge devices (122, 124) as described throughout this application.

In one or more embodiments, the device network manager (140) is implemented as system management hardware with the functionality to manage multiple computing devices on a network. The device network manager (140) may include persistent memory that has the capability to store sensor data for the hardware on the device network (120), operating system and application data for devices (122, 124, 126, 128) on the device network (120), and resource usage data. The device network manager (140) includes functionality to communicate between the device network (120) and the WAN (102) in order to gather information on the activity of the devices, their connectivity to the network, and the status of the data they are transmitting. In the context of this invention, the device network manager (140) further includes functionality to perform allocation of data processing requests on the device network (120).

In one or more embodiments, the device network manager (140) performs an analysis of the hardware (including, but not limited to, edge devices (122, 124) and IoT devices (126, 128) on a device network (120)) in order to understand the status of each device and the energy consumption across the devices. Based on this workload, the device network manager (140) includes functionality to generate an energy conservation policy (156) and reallocate work to other devices if need be. Additional details regarding the device network manager (140) can be found, for example, in FIG. 1.3.

In one or more embodiments, the device network manager (140) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the device network manager (140) as described throughout this application and/or the methods of FIGS. 2.1 and 3.1.

Turning now to FIG. 1.2, FIG. 1.2 shows a diagram of an individual edge device (132) in accordance with one or more embodiments of the invention. The edge device (122) of FIG. 1.2 may be an embodiment of an edge device (122, 124, FIG. 1.1) discussed above. The edge device (122) may include a plurality of applications (130, 132), a real-time monitoring agent (134), and other computing resources (136). The edge device (122) may include additional, fewer, and/or different components without departing from the invention. Each of the aforementioned components of the edge device (122) is discussed below.

In one or more embodiments, the applications (130, 132) refer to at least one application that may exist on the edge device (122) and may perform a variety of functionalities for the edge device. Functionalities of the applications may include a plurality of different tasks, including but not limited to any number of software, data managers, media players, data collection (e.g., from IoT devices (126, 128)) etc.

In one or more embodiments, the real-time monitoring agent (134) may refer to an agent on the edge device (122) that continuously monitors the status of the edge device (122) in real time. This agent (134) may monitor information such as the status of the device in terms of if the edge device is awake or asleep, the data processing output of the edge device, the computing resource use of the computing resources (136), and the idle time information for the edge device (122). In one or more embodiments, an edge device that is “asleep” or “sleeping” refers to an edge device that is conserving power consumption by reducing resource use to minimum use. An edge device that is asleep may in a mode that may not be favorable for servicing any data processing requests. In contrast, an edge device may be “awake”, which refers to an edge device that is enabled to utilize any power consumption and computing resources available for servicing its functionality as an edge device (122) described throughout. The edge devices may be set to sleep or set to awake mode (also referred to as “waking up”) by an administrator, by the device network manager, and/or based on an idle time of the edge device. An edge device may be awake but inactive, which results in the edge device being idle. If an edge device is idle, it may still be using computing resources even while it is not actively servicing data processing request. The idle time information is tracked in real-time, but historical idle time information for each device may also be tracked over time in order to help generate a more accurate energy conservation policy (discussed in FIG. 1.3). Idle time information for each of the edge devices (122) may be used for idle time predictions for each edge device (e.g., 122), and the information obtained by the real-time monitoring agent (134) will be a component of the system topology information (154, FIG. 1.3). Additional details on the usage of this information will be discussed in FIGS. 2.1 and 3.1.

In one or more embodiments, computing resources (136) may refer to hardware or software elements of the edge device (122) that may be available or unavailable to perform tasks and/or used to execute the applications (130, 132). Computing resources (136) may include, but are not limited to, resources such as volatile storage, persistent storage, CPU usage, GPU usage, power, and networking interfaces. The computing resources (136) available to each edge device (122) may be dependent on the workload on the device at any given time and the type of edge device, discussed previously in FIG. 1.1.

FIG. 1.3 shows a diagram of the device network manager (140) in accordance with one or more embodiments of the invention. The device network manager (140) of FIG. 1.3 may be an embodiment of a device network manager (140, FIG. 1.1) discussed above. The device network manager (140) may include an analyzing agent (142), an energy conservation optimizing agent (146), a redirector agent (148), and device network storage (150). The device network manager (140) may include additional, fewer, and/or different components without departing from the invention. Each of the aforementioned components of the device network manager (140) is discussed below.

In one or more embodiments, the analyzing agent (142) includes the functionality to obtain information on the telemetry data (152) of a device network (120). Additional information on the telemetry data (152) gathered by the analyzing agent (142) is discussed below.

In one or more embodiments, the energy conservation optimizing agent (146) includes the functionality to generate an energy conservation policy (156) based on the telemetry data (152) and system topology information (154). The energy conservation optimizing agent (146) may also include functionality to identify edge devices that may be set to sleep based on historical idle time data obtained from the real-time monitoring agent(s) (FIG. 1.2, 134) of the edge devices (FIG. 1.2, 122) on the device network (FIG. 1.2, 120). Additional information on the functionality of the energy conservation optimizing agent (146) is discussed below in FIGS. 2.1-2.2.

In one or more embodiments, the redirector agent (148) includes the functionality to redirect a data processing requests to a corresponding edge device. The request that may be redirected by the redirector agent (148) may be from either an IoT device (126, 128) or another edge device (122, 124) on the device network (120). The redirection may be performed in accordance with the energy conservation policy (156) discussed throughout. Additional information on the functionality of the redirector agent (148) is discussed at length in FIGS. 3.1-3.2.

In one or more embodiments, the device network storage (150) may store a variety of information about the system described in FIG. 1.1 and its processes. The device network storage may include telemetry data (152), system topology information (154), and an energy conservation policy (156). The device network storage (150) may include additional, fewer, and/or different components without departing from the invention. Each of the aforementioned components of the device network storage (150) is discussed below.

In one or more embodiments, the telemetry data (152) may include information about the operation (e.g., workload, available resources, idle time, sleep or awake mode, etc.) of devices on the device network (120) during a period of time. The device network manager (140) may gather information via the analyzing agent (142) on how the devices in the device network (120) function, including which edge devices (122, 124) are available or unavailable, or asleep or awake. The telemetry data (152) may also include information on the previous data processing requests redirected by the device network manager (120) in the system.

In one or more embodiments, system topology information (154) refers to information about the organization and structure of the system of FIG. 1.1. In the context of this invention, system topology information (154) refers to how the devices (122, 124, 126, 128, FIG. 1.1) are organized and utilized on the device network (120, FIG. 1.1). System topology information (154) may include content such as a layout of the device network, a number of hops used to communicate between two edge devices, which edge devices (122, 124) are awake or asleep, the workload for the devices, computer resource usage, etc. The system topology information of a system may include other information about the system without departing from the context of this invention.

In one or more embodiments, the energy conservation policy (156) refers to a policy generated on the device network manager (140), more specifically by the energy conservation optimizing agent (146). The energy conservation policy (156) may be generated based on the telemetry data (152) and system topology information (154) of devices in the device network (120, FIG. 1.1), including idle time predictions for each device. The energy conservation policy (156), once generated, specifies guidance for the device network manager (140) on what backup strategy approach to use for each data processing request received.

The energy conservation policy (156) may specify a set of conditions and backup strategies for managing the servicing of data processing requests issued to edge devices that are asleep. Specifically, based on a criticality of the request, a criticality of the application issuing the request, an urgency of a data processing request, an idle time of the target edge device of the data processing request, or any other parameters, the redirector agent (148) may consult the energy conservation policy (156) to determine a backup strategy to implement for servicing the data processing request. Examples of backup strategies to be implemented include, but are not limited to, waking up the target edge device immediately and sending the data processing request to the now-awake edge device, waiting a specified time before waking up the edge device and subsequently sending the data processing request, sending the data processing request to a second edge device that neighbors the target sleeping edge device, or transmitting the data processing request to the serviced by a global data system (e.g., 110, FIG. 1.1).

FIG. 2.1 shows a flowchart of a method for generating an energy conservation policy in accordance with one or more embodiments of the invention. The method may be performed by, for example, the analyzing agent of the device network manager (140, 142, FIG. 1.3) Other components of the system illustrated in FIGS. 1.1-1.3 may perform all, or a portion, of the method of FIG. 2.1 without departing from the invention.

While FIG. 2.1 is illustrated as a series of steps, any of the steps may be omitted, performed in a different order, include additional steps, and/or perform any or all of the steps in a parallel and/or partially overlapping manner without departing from the invention.

In Step 200, the analyzing agent in the device network manager obtains telemetry data of a device network. The analyzing agent may obtain information such as the connectivity to the wide area network by the devices, sensor data for individual or multiple IoT devices, information about the hardware of the devices, memory utilization, application and resource usage within each edge device on the device network, etc. Telemetry data of the device network may also include information on the data being sent to any number of the edge devices by other edge devices on the system, or by any IoT devices.

In Step 202, system topology information is generated by the device network manager. This system topology information may include the hierarchy of devices in the system, a list of suitable neighbors per device, and idle time predictions for each of the edge devices. The idle time of each edge device may be obtained from a real-time monitoring agent existing on each edge device, discussed previously in FIG. 1.2. The idle time predictions may include a linear regression (or other form of machine learning model) for predicting a length of time that an edge device is predicted to be idle. The list of suitable neighbors specifies a list of devices that have a shortest path to a given edge device. This system topology information may include other information without departing from the scope of the invention.

In one or more embodiments, the system topology information that is generated relates to details regarding the system such as, for example, which edge devices are modular (e.g., whether the edge device implements a logical partition of components into modules that may be individually configured, expanded, upgraded, or replaced), which edge devices neighbor other edge devices, the heterogeneity of requests serviced by each edge device, a workload type of each data processing request, processor types (e.g., CPUs, GPUs, enhanced networking interfaces, etc.) of the edge devices, workload size of each edge device, a predictability of workloads for each edge node, a fog network that each edge devices communicates with, which IoT devices each edge device communicates with, a category of each IoT device, a criticality of IoT device, applications executing on (or communicating with) each edge device, a criticality of each application that issues data processing requests, a response time (or average response time) of each edge device, a security level (e.g., whether a security measure such as encryption protocol is implemented) of the edge device, and an expected wake up time of each edge device. The criticality of an entity refers to a level of importance of the entity to be serviced or a level of acceptable latency that may be applied to the servicing of a given entity. For example, an application with a high criticality may be associated with a low level of latency that is acceptable. In this example, a highly critical application is to be serviced as quickly as possible, without focusing on energy conservation of the edge devices servicing data processing requests issued by the highly critical application.

In Step 204, the system topology information generated in Step 204 is sent from the analyzing agent to the energy conservation optimizing agent. The information sent to the energy conservation optimizing agent will include any information needed by the energy conservation optimizing agent to fully understand the topology of the system.

In Step 206, an energy conservation policy is generated by the energy conservation optimizing agent using the system topology information. This policy includes a method for servicing a data request on the system while considering the energy conservation of edge devices that are in sleep mode and based on the system topology at the time of the request. In the context of this invention, there may be four potential backup strategies included in the energy conservation policy. Based on the system topology information at the time of the request, the energy conservation policy may inform the device network manager on the most energy efficient backup strategy for the request. Additional information on potential backup strategies is provided below in FIG. 2.1.

In Step 208, the energy conservation policy is stored by the device network manager in the device network storage for future use. The energy conservation policy is used in the methodology described in FIG. 3.1.

To further describe the methodology in FIG. 2.1, an Example section is provided below.

Example—Energy Conservation Policy Generation

Turning to FIG. 2.2, FIG. 2.2 shows a diagram of an example system. For the sake of brevity, not all components of the example system are illustrated in FIG. 2.2. The example system includes at least a device network with a plurality of edge and IoT devices and a device network manager. The device network manager includes an analyzing agent, an energy conservation optimizing agent, a redirector agent, and device network storage. The device network storage includes an energy conservation policy, which in this example, includes four possible backup strategies.

In the following example, a sequence of operations illustrated in FIG. 2.2 as the circled numbers are described below using brackets.

In this methodology, the telemetry data of the edge (212, 214) and IoT (216, 218) devices on the device network is obtained by the analyzing agent (222) [1]. Once the analyzing agent (222) of the device network manager (220) obtains the telemetry data, it generates system topology information based on the telemetry data. The system topology information may include information such as a hierarchy of devices on the device network (210), a list of suitable neighbor devices for each of the edge devices that may be able to assist in servicing data processing requests for a specific edge device, and which edge devices are awake or asleep [2]. This system topology information is subsequently sent from the analyzing agent (222) to the energy conservation optimizing agent (224) [3]. Based on the system topology information, the energy conservation optimizing agent (224) generates an energy conservation policy (230) and stores it in the device network storage (228) [4].

In this example, the energy conservation policy (230) stored in the device network storage (228) [4] includes four potential backup strategies that may be used for a data processing request received by the device network manager (220) that specify a target edge device that is asleep. One example of a potential backup strategy, if the edge device that is specified for the request is asleep, would be for the device network manager to wake up the edge device in order to service the data processing request. A second example of a potential backup strategy, if the edge device that is specified for the request is asleep, would be to wait until the edge device wakes back up. The edge device may be on a schedule, i.e., being asleep during weekends or non-business hours, for example. In this backup strategy, the data processing request would be serviced as normal by the specified edge device once it woke up. In the event that the device network manager cannot wake up the specified edge device or wait for the edge device to wake up, it may redirect the data processing request to another location. This may be done even if the specified edge device is available, such as if redirecting the request would be more energy efficient for the system. One example of a potential backup strategy would be to redirect the data processing request to a neighboring edge device that is awake and available to service the request. If there are no available edge devices, the data processing request may be redirected to the cloud [4].

FIG. 3.1 shows a flowchart of a method for generating an energy conservation policy in accordance with one or more embodiments of the invention. The method may be performed by, for example, the redirector agent of the device network manager (140, 148, FIG. 1.3) Other components of the system illustrated in FIGS. 1.1-1.3 may perform all, or a portion, of the method of FIG. 2.2 without departing from the invention.

While FIG. 3.1 is illustrated as a series of steps, any of the steps may be omitted, performed in a different order, include additional steps, and/or perform any or all of the steps in a parallel and/or partially overlapping manner without departing from the invention.

In Step 300, the redirector agent of the device network manager receives a data processing request. This request may specify a specific edge device on the device network system to process specified data. The data processing request received by the redirector agent may come from either an edge device or an IoT device on the device network.

In Step 302, a determination is made about whether or not the edge device that the data processing request specifies is in sleep mode. If the edge device is asleep, the methodology proceeds to Step 304; if the edge device is awake, the methodology proceeds to Step 310.

In Step 304, the device network manager from the device network storage obtains the energy conservation policy from device network storage. The energy conservation policy is context aware, based on telemetry data and system topology information, which includes idle time predictions for the edge devices on the system.

In Step 306, the backup strategy for the data processing request is determined using the energy conservation policy. Using the telemetry data and the system topology information, the device network manager selects a backup strategy while considering parameters such as, for example: the energy conservation of the sleeping edge device to reduce power consumption, a level of acceptable latency for servicing the data processing request, and the predicted idle times of the neighboring edge devices in the device network. The energy conservation policy may specify a set of conditions implemented based on the aforementioned parameters, and based on the conditions met, a backup strategy is selected to be implemented for servicing the data processing request.

In Step 308, the backup strategy is applied in order to service the data processing request. Additional details on potential backup strategies can be found, for example, in FIG. 2.2. The method ends after the application and implementation of the backup strategy in order to service the data processing request.

In Step 310, the data processing request is sent to the awake edge device specified in the data processing request in order to service the request. The data processing request may be subsequently serviced by the target edge device. Given the edge device was in awake mode, consulting the energy conservation policy is not required to service the data processing request.

To further describe the methodology in FIG. 2.1, an Example section is provided below.

Example—Energy Conservation Policy Application

Turning to FIG. 3.2, FIG. 3.2 shows a diagram of an example system. For the sake of brevity, not all components of the example system are illustrated in FIG. 2.2. The example system includes at least a device network with a plurality of edge and IoT devices and a cloud environment.

In the following example, a sequence of operations illustrated in FIG. 3.2 as the circled numbers are described below using brackets.

In the methodology of this example, an IoT device (320) sends a data processing request to the device network manager (322). A data processing request may also be sent by an edge device on the device network, not shown in this figure. This request is received by the redirector agent in the device network manager (322), and includes a specified edge device, in this instance edge device A (324), intended to process the request [1]. The redirector agent then makes a determination, based on the system topology information and which nodes are awake or idle, about whether or not the edge device specified in the request (324) is in sleep mode [2]. If edge device A (324) is awake, the device network manager will service the data processing request on the specified and available device (324) [3]. If edge device A (324) is asleep, the device network manager (322) may consider a criticality of the data processing request and decide, based on the energy conservation policy and based on a low criticality identified for the data processing request, that the most efficient backup strategy would be to wait for the edge device specified in the request to wake up [3]. If edge device A (324) is busy or asleep and the energy conservation policy indicates that it would be more efficient to reallocate the data processing request to another edge device, for example edge device B (326), the redirector agent in the device network manager may send the request to edge device B (326) to be serviced [4]. If all edge devices (324, 326) are occupied, asleep, or otherwise unavailable, the device network manager may redirect the data processing request to a cloud environment (328) to process the data instead of an edge device [5]. Each of [3], [4], and [5] may be one of three backup strategies that may be implemented on the data processing request while considering parameters of the system and using a set of conditions specified in the energy conservation policy.

As discussed above, embodiments of the invention may be implemented using computing devices. Turning now to FIG. 4, FIG. 4 shows a diagram of a computing device in accordance with one or more embodiments of the invention. The computer (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) (402) may be one or more cores or micro-cores of a processor. The computer (400) may also include one or more input devices (410), such as a touchscreen, keyboard, mouse, microphone, touchpad, electronic pen, or any other type of input device. Further, the communication interface (412) may include an integrated circuit for connecting the computer (400) to a network (not shown) (e.g., a local area network (LAN), a wide area network (WAN) such as the Internet, mobile network, or any other type of network) and/or to another device, such as another computing device.

In one embodiment of the invention, the computer (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices in a device network. Specifically, embodiments of the invention relate to a method of conserving energy while servicing data processing requests on a device network.

One or more embodiments of the invention relates to a method of generating and implementing an energy conservation policy on a device network in order to optimize the energy consumption used to service data processing requests. With this technology, data processing requests may be serviced in the most energy efficient way while considering an acceptable level of latency for the data processing request, whether sent to an originally specified device, an alternate device, or a cloud computing server. By generating this policy based on the telemetry data, historical idle time information for the devices, and system topology information, the device network manager is continuously aware of the status of the devices on the system. The energy conservation policy generated in this invention is context aware, and selects the best backup strategy for each request made on the device network. Further, the energy conservation policy may also inform the device network manager that some devices have been idle for a while and can be put to sleep, which would contribute to energy conservation as well.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing a device network, comprising:
- receiving, by a device network manager, a data processing request, wherein the data processing request specifies an edge device to process data;
- in response to receiving the data processing request:
  - making a determination that the edge device is in sleep mode;
  - based on the determination, obtaining an energy conservation policy from device network storage;
  - determining a backup strategy for the data processing request using the energy conservation policy; and
  - applying the backup strategy to service the data processing request.

2. The method of claim 1, wherein the backup strategy specifies waiting a predetermined period of time before transmitting the data processing request to the edge device.

3. The method of claim 1, wherein the backup strategy specifies waking up the edge device, and wherein applying the backup strategy comprises sending the data processing request to the edge device.

4. The method of claim 1, wherein the backup strategy comprises redirecting the data processing request to a neighboring edge device, wherein the neighboring edge device is awake.

5. The method of claim 1, further comprising:
- prior to receiving the data processing request:
  - obtaining, by the device network manager, telemetry data of the device network, wherein the device network comprises the edge device;
  - generating system topology information of the device network using the telemetry data;
  - generating, using the system topology information, the energy conservation policy; and
  - storing the energy conservation policy in the device network storage.

6. The method of claim 5, wherein the system topology information comprises: a hierarchy of devices in the device network, a list of suitable neighbors for the edge device, and an idle time prediction for the edge device.

7. The method of claim 5, wherein the device network further comprises an internet of things (IoT) device, and wherein the data processing request is obtained from the IoT device.

8. The method of claim 1, further comprising:
- receiving, by the device network manager, a second data processing request, wherein the second data processing request specifies the edge device to process second data;
- in response to receiving the second data processing request:
  - making a second determination that the edge device is not in sleep mode; and
  - based on the second determination, transmitting the data processing request to the edge device.

9. A system comprising:
- a device network comprising an edge device; and
- a device network manager operatively connected to the device network and comprising a processor, wherein the processor is programmed to:
  - receive a data processing request, wherein the data processing request specifies the edge device to process data;
  - in response to receiving the data processing request:
    - make a determination that the edge device is in sleep mode;

based on the determination, obtain an energy conservation policy from device network storage;

determine a backup strategy for the data processing request using the energy conservation policy; and apply the backup strategy to service the data processing request.

10. The system of claim 9, wherein the backup strategy specifies waiting a predetermined period of time before transmitting the data processing request to the edge device.

11. The system of claim 9, wherein the backup strategy specifies waking up the edge device, and wherein applying the backup strategy comprises sending the data processing request to the edge device.

12. The system of claim 9, wherein the backup strategy comprises redirecting the data processing request to a neighboring edge device, wherein the neighboring edge device is awake.

13. The system of claim 9, wherein the processor is further programmed to:

prior to receiving the data processing request:

obtain telemetry data of the device network, wherein the device network comprises the edge device;

generate system topology information of the device network using the telemetry data;

generate, using the system topology information, the energy conservation policy; and store the energy conservation policy in the device network storage.

14. The system of claim 13, wherein the system topology information comprises: a hierarchy of devices in the device network, a list of suitable neighbors for the edge device, and an idle time prediction for the edge device.

15. The system of claim 13, wherein the device network further comprises an IoT device, and wherein the data processing request is obtained from the IoT device.

16. The system of claim 9, wherein the processor is further programmed to:

receive a second data processing request, wherein the second data processing request specifies the edge device to process second data;

in response to receiving the second data processing request:

making a second determination that the edge device is not in sleep mode; and based on the second determination, transmitting the data processing request to the edge device.

17. A non-transitory computer readable medium comprising computer readable program code, which when executed by a computer processor enables the computer processor to perform a method for managing a device network, the method comprising:

receiving a data processing request, wherein the data processing request specifies an edge device to process data;

in response to receiving the data processing request:

making a determination that the edge device is in sleep mode;

based on the determination, obtaining an energy conservation policy from device network storage;

determining a backup strategy for the data processing request using the energy conservation policy; and applying the backup strategy to service the data processing request.

18. The non-transitory computer readable medium of claim 17, wherein the backup strategy specifies waiting a predetermined period of time before transmitting the data processing request to the edge device.

19. The non-transitory computer readable medium of claim 17, wherein the backup strategy specifies waking up the edge device, and wherein applying the backup strategy comprises sending the data processing request to the edge device.

20. The non-transitory computer readable medium of claim 17, wherein the backup strategy comprises redirecting the data processing request to a neighboring edge device, wherein the neighboring edge device is awake.

* * * * *